Sept. 18, 1945. S. P. DE MATO 2,384,895
ATTACHMENT FOR SCREW MACHINES
Filed Feb. 7, 1945
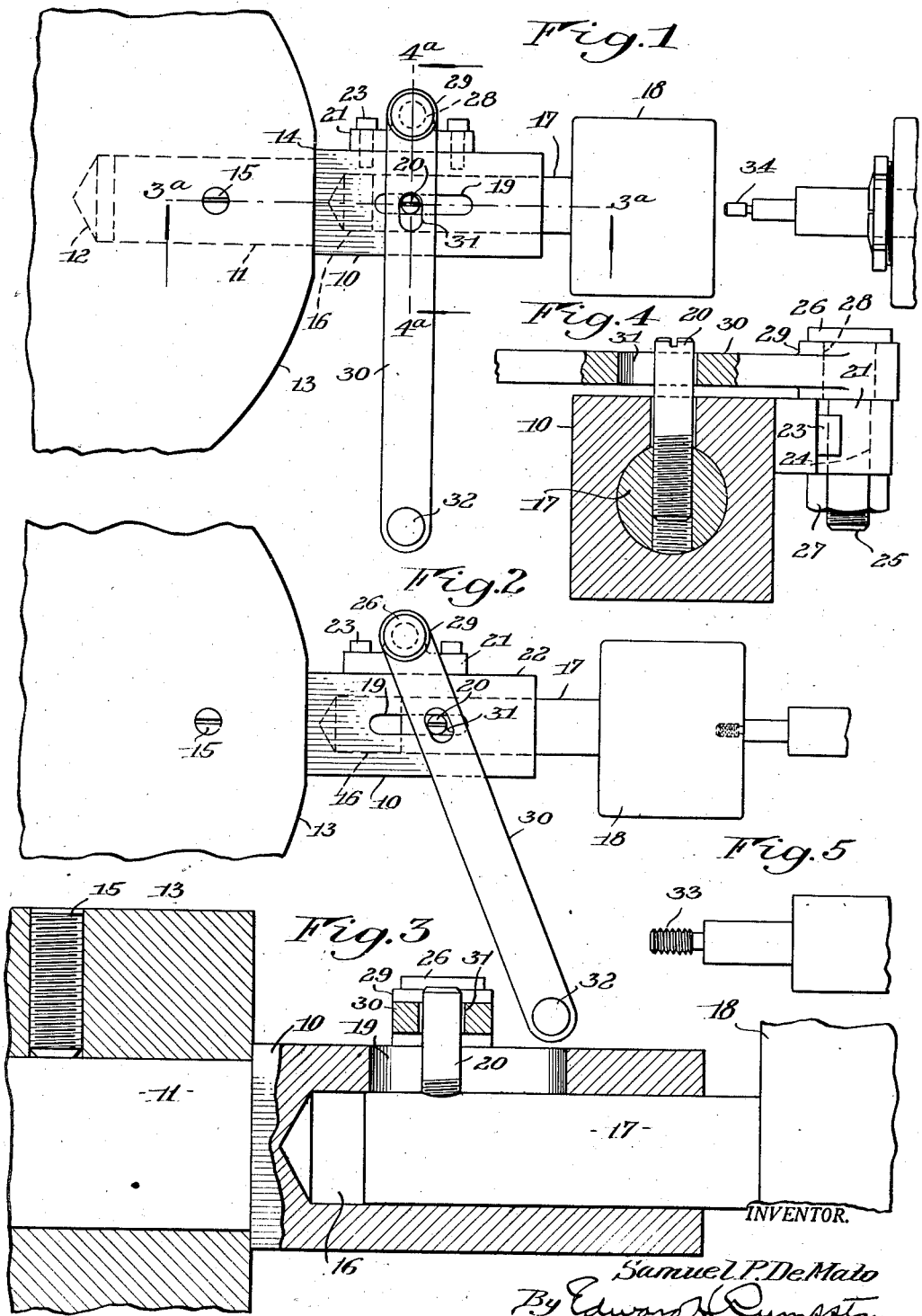
INVENTOR.
Samuel P. De Mato
By Edward H. Dumpston
his Attorney Patented Sept. 18, 1945

2,384,895

UNITED STATES PATENT OFFICE 2,384,895

ATTACHMENT FOR SCREW MACHINES

Samuel P. De Mato, Rochester, N. Y., assignor to James Cunningham, Son & Company, a partnership composed of Augustine J. Cunningham and Francis E. Cunningham, Rochester, N. Y.

Application February 7, 1945, Serial No. 576,636

3 Claims. (Cl. 10—89)

This invention relates to screw machines and, more particularly, to means for manually feeding a die holding tool thereof for cutting light or fine pitch threads. Ordinary screw machines, turret lathes, and the like, capable of heavy duty work, comprise a heavy carriage, commonly weighing two hundred pounds or more, fed to the work by lead screw means, frequently with some lost motion in the tool. It has been found impracticable to employ such machines for cutting light threads of fine pitch or small diameter, because, in case of any lack of synchronism between the feed of the machine and the lead of the thread on the work, backlash or other lost motion, the substantial mass and inertia of the carriage, turret and other tool actuating parts results in a longitudinal thrust or pressure tending to deform and strip the threads before the lead or cut of the dies on the work is sufficiently established, due to the weakness of the starting threads and their inability to move the carriage parts and maintain the dies in proper threading engagement with the work. It is frequently necessary, therefore, after accomplishing the heavier machining operations on a large work piece, to subsequently set up the piece in some other light machine, for the more delicate work of cutting such light threads. This necessitates two machines and two operations to complete the work, adding materially to its cost.

One object of the invention, therefore, is to provide a simple, practical and effective means for accomplishing such light threading work in the same machine employed for heavier operations and thereby reducing the time, effort and expense required for such work.

Another object is to provide a practicable and convenient attachment for screw machines, turret lathes, and the like, capable of being readily inserted in and removed from the tool sockets thereof, for adapting such machines for cutting light screw threads, so that work pieces requiring such threads, as well as parts requiring heavier operations, can be efficiently accomplished in the same machine.

A further object is to provide an attachment having the above advantages and comprising but few parts capable of being readily manufactured and assembled at a comparatively low cost.

To these and other ends the invention resides in certain improvements and combinations of parts, all as will be hereinafter more fully described, the novel features being pointed out in the claims at the end of the specification.

In the drawing:

Fig. 1 is a top plan view of an attachment embodying the present invention shown assembled in a screw machine turret;

Fig. 2 is a view similar to Fig. 1, but showing the parts in a different operating position;

Fig. 3 is a sectional elevation on the line 3a—3a in Fig. 1;

Fig. 4 is a sectional elevation on the line 4a—4a in Fig. 1, and

Fig. 5 is a view showing the finished work.

The invention is herein disclosed, by way of illustration, as embodied in a device comprising a member 10, preferably of rectangular shape in cross section, formed at one end with a cylindrical shank 11 having a diameter adapting it to closely fit a socket 12 of a turret 13 of a screw machine or lathe, in which the shank is inserted up to the shoulder 14 at its junction with the member 10, and secured as by means of a set screw 15, in the normal manner of mounting a tool in the socket of a screw machine turret.

The member 10 is formed at its opposite end with a longitudinally extending, cylindrical socket 16, for the reception of a shank 17 of a known type of geometrical die holder 18, carrying the threading dies. The wall of socket 16 is formed with a longitudinally extending slot 19 and the die holder shank 17 is tapped and provided with a cylindrical pin 20 adapted to closely fit and project upwardly through slot 19, as shown, for a purpose hereafter described.

The member 10 is provided with manually operable means for engaging pin 20 to effect longitudinal sliding movement of the die holder in socket 16, comprising, preferably, a bracket 21 fixed on a side 22 of member 10, as by means of stud bolts 23. The bracket is formed with a vertical bore 24 for the reception of a bolt 25 having at its upper end a head 26 and at its lower end a securing nut 27. Bolt 25 is passed through a bore 28 in a boss 29 formed on one end of a hand lever 30, which is thus mounted to swing about bolt 25 as a pivot. Lever 30 extends transversely across the top of member 10 and is formed with an elongated slot 31 extending longitudinally of the lever and embracing the upper end of the pin 20 of the die holder, as shown. The lever is of substantial length so as to afford substantial leverage for moving the die holder, and is provided at its outer end with a convenient handle 32, the attachment being located in the turret socket so as to position the handle in a convenient horizontal plane.

In operation, after employing a screw machine or turret lathe in performing other and heavier operations on a work piece, a light thread 33 may then be cut on a work piece part 34 of small diameter, by mounting an attachment embodying the present invention in one of the tool sockets of the turret of the same machine. For this purpose, the carriage of the machine is moved to locate the attachment with its die holder adjacent the work, as shown in Fig. 1, the carriage being then clamped in position by the usual means. With the work piece in rotation, handle 30 is then swung to the right as shown in Fig. 2, to feed the die holder with a light, steady pressure against the work. Since the working parts of the attachment are of negligible mass and inertia, the die immediately begins to cut accurate threads on the work, and engagement of the dies with the work thereafter readily controls feeding movement of the moving parts of the attachment, so that the threads 33, Fig. 5, however fine, are precisely and quickly cut on the work, the die holder being provided with the usual automatic stop means for throwing off the dies at the end of the cut, as well understood in the art. By means of the invention, therefore, the same screw machine, however heavy, may be quickly and conveniently adapted for performing, not only the heavier operations, but also the cutting of the finest threads.

It will thus be seen that the invention accomplishes its objects and while it has been herein disclosed by reference to the details of a particular embodiment, it is to be understood that such disclosure is intended in an illustrative, rather than a limiting sense, as it is contemplated that various modifications in the construction and arrangement of the parts will readily occur to those skilled in the art, within the spirit of the invention and the scope of the appended claims.

I claim:

1. An attachment for a screw machine having a tool socket, for adapting said machine for cutting light screw threads, said attachment comprising a member formed at one end with a socket for a die holder and at its other end with a shank for insertion in said tool socket, a die holder provided with threading dies and having a shank movable longitudinally in said member socket, a hand lever pivoted on said member, and means connecting said lever and die holder for manually moving said die holder to bring the dies thereof into threading engagement with the work.

2. An attachment for a screw machine having a tool socket, for adapting said machine for cutting light screw threads, said attachment comprising a member formed at one end with a socket for a die holder and at the other end with a shank for insertion in said tool socket, said member having a wall of said socket thereof formed with a longitudinal slot, a die holder provided with threading dies and having a shank movable longitudinally in said member socket, a pin on said die holder extending outwardly through said slot, and a hand lever pivoted on said member and provided with means engaging said pin for manually moving said die holder to bring the dies thereof into threading engagement with the work.

3. An attachment for a screw machine having a tool socket, for adapting said machine for cutting light screw threads, said attachment comprising a member formed at one end with a socket for a die holder and at its other end with a shank for insertion in said tool socket, said member having the wall of said socket thereof formed with a longitudinal slot, a die holder provided with threading dies and having a shank movable longitudinally in said member socket, a pin on said die holder extending outwardly through said slot, a bracket on one side of said member spaced from and opposite said slot and a lever pivoted on said bracket and formed with a slot extending transversely of said socket wall slot and loosely engaging said pin, for manually moving said die holder to bring the dies thereof into threading engagement with the work.

SAMUEL P. DE MATO.